(12) United States Patent
Stupp et al.

(10) Patent No.: US 6,222,705 B1
(45) Date of Patent: Apr. 24, 2001

(54) ROTARY MAGNETIC HEAD DEVICE FOR A MAGNETIC RECORDING AND REPRODUCING APPARATUS

(75) Inventors: Steven E. Stupp, Mountain View, CA (US); Kofi A. A. Makinwa; Martinus L. J. M. Van De Ven, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/268,257

(22) Filed: Mar. 15, 1999

(30) Foreign Application Priority Data

Mar. 13, 1998 (EP) .................................................. 98200804

(51) Int. Cl.[7] .............................. G11B 5/58; G11B 21/24
(52) U.S. Cl. ..................................... 360/291.6; 360/291.4
(58) Field of Search ............................ 360/251.1, 251.4, 360/251.5, 291, 291.4, 291.6, 291.7, 291.8

(56) References Cited

U.S. PATENT DOCUMENTS

| | | | |
|---|---|---|---|
| 3,048,665 | * | 8/1962 | Wilcox . |
| 3,076,060 | * | 1/1963 | Horstkorta . |
| 3,389,217 | * | 6/1968 | Kihara . |
| 4,825,984 | * | 5/1989 | Morris et al. .................. 188/378 |
| 5,012,373 | * | 4/1991 | Saito .................................. 360/107 |
| 5,166,848 | * | 11/1992 | Plachy ............................... 360/109 |
| 5,223,992 | | 6/1993 | Mitsuhashi ......................... 360/75 |

FOREIGN PATENT DOCUMENTS

| | | | |
|---|---|---|---|
| 62-1109 | * | 1/1987 | (JP) . |
| 62-124621 | * | 6/1987 | (JP) . |
| 64-57414 | * | 3/1989 | (JP) . |
| 1-100725 | * | 4/1989 | (JP) . |
| 1-223616 | * | 9/1989 | (JP) . |
| 3-154259 | * | 7/1991 | (JP) . |
| 96/388840 | * | 12/1996 | (WO) . |

OTHER PUBLICATIONS

Van Nostrand's Scientific Encyclopedia, Eighth Edition, 1995, pp. 1204, 1206.

* cited by examiner

*Primary Examiner*—William Klimowicz
(74) *Attorney, Agent, or Firm*—Edward W. Goodman

(57) ABSTRACT

A rotary magnetic head device for a helical scanning magnetic recording and reproducing apparatus includes a rotary drum, a thin-film magnetic head (6) protruding from the rotary drum in a diametrical direction for coming into contact with a magnetic tape (7), obliquely wound around part of the outer peripheral surface of the rotary drum, and head control circuit for adjusting the protrusion of the magnetic head (6) in the diametrical direction. The head control circuit includes a feed-forward control arrangement (9) to bring and hold the magnetic head into a protruded position in which the magnetic head exerts a constant normal force on a tape (7) wound around the drum.

10 Claims, 1 Drawing Sheet

ROTARY MAGNETIC HEAD DEVICE FOR A MAGNETIC RECORDING AND REPRODUCING APPARATUS

BACKGROUND OF THE INVENTION

1. Field of the Invention

The present invention relates to a rotary magnetic head device for a helical scanning magnetic recording and reproducing apparatus, comprising a rotary drum, a thin-film magnetic head protruding from the rotary drum in a diametrical direction for coming into contact with a magnetic tape, wound around part of the outer peripheral surface of the rotary drum, and head control means for adjusting the protrusion of the magnetic head in the diametrical direction.

2. Description of the Related Art

Such a rotary magnetic head device is known from U.S. Pat. No. 5,223,992. The device in this document is provided with an envelope detector for detecting an envelope of a reproduced signal from the magnetic head, search means, coupled to the envelope detector, for obtaining a minimum amount of projection of the magnetic head in a projection range in which a detected envelope level is saturated, by sequentially driving the magnetic head to vary the projection of the magnetic head, and control means for controlling the magnetic head to position the magnetic head at a projection which coincides with the minimum amount of projection obtained by the search means. In other words, the head control means comprises a feed-back control arrangement to bring and hold the magnetic head into a desired protruded position.

SUMMARY OF THE INVENTION

An object of the invention is to simplify this magnetic head device while maintaining a good contact between the magnetic head and the tape, together with a relatively low thin-film head wear.

To achieve this object the head control means comprises a feed-forward control arrangement to bring and hold the magnetic head into a protruded position in which it exerts a constant normal force on a tape wounded around the drum. This normal force is preferably about 3–4 mN, these values corresponding, more or less, with about 10% of the normal force exerted by an ordinary inductive head. The omission of a specific feed-back arrangement implies a simplification with respect to the above mentioned prior art, while still the desired accuracy is obtained.

In a particular embodiment, the feed-forward control arrangement comprises a voice-coil-actuator which is energized with a constant electric current, the strength of which determining the magnitude of the normal force. This current is preferably be adjusted in such a manner that a normal force of about 3–4 mN is exerted on a tape wounded around the drum. The wear of the magnetic head is small compared with the voice-coil-actuator dimensions. The force exerted by the voice-coil-actuator varies linearly over such small length changes.

Although a certain protection of the magnetic head caused by sudden mechanical shocks is obtained by the forced contact of the magnetic head against the tape, it may be desirable to provide the voice-coil-actuator with a voice-coil and a magnetic rod movable therethrough, one end of the magnetic rod being coupled with the magnetic head and the other end being coupled with a damping device. Over long time scales, such as those associated with wear, the damping will have no impact. Further, in this respect, elastomer connection means may be provided to couple the magnetic head with the magnetic rod.

In a specific embodiment the device comprises a housing for the magnetic head and the voice-coil-actuator. This housing comprises a first hole to accommodate the magnetic head, this first hole opening into a second hole, the second hole accommodating the voice-coil-actuator and being in line with and wider than the first hole. A tape which, without contact with a magnetic head as in the case of an inductive head, is stretched over the first hole, acts like a drum membrane and will vibrate. These vibrations tend to modify the head-to-tape distance, giving rise to fluctuations and noise in the magnetic head signal. By the above-mentioned low normal force of 3–4 mN, such fluctuations and noise are strongly reduced. Further, the width of the first hole in at least the tape track direction must be matched to the dimensions of the magnetic head. On the one hand, side motions of the magnetic head in the tape track direction must be strongly limited, while, on the other hand, the friction between the inner wall of the first hole and the magnetic head must be kept small with respect to the above-mentioned constant normal force.

To prevent the magnetic head from being launched out of the first hole, a stop is provided in the housing for arresting the movement of the magnetic head in the diametrical direction out of the housing.

The invention also relates to a helical scanning magnetic recording and reproducing apparatus provided with a rotary magnetic head device in accordance with the invention as described here before.

DETAILED DESCRIPTION OF THE PREFERRED EMBODIMENT

Figure 1:
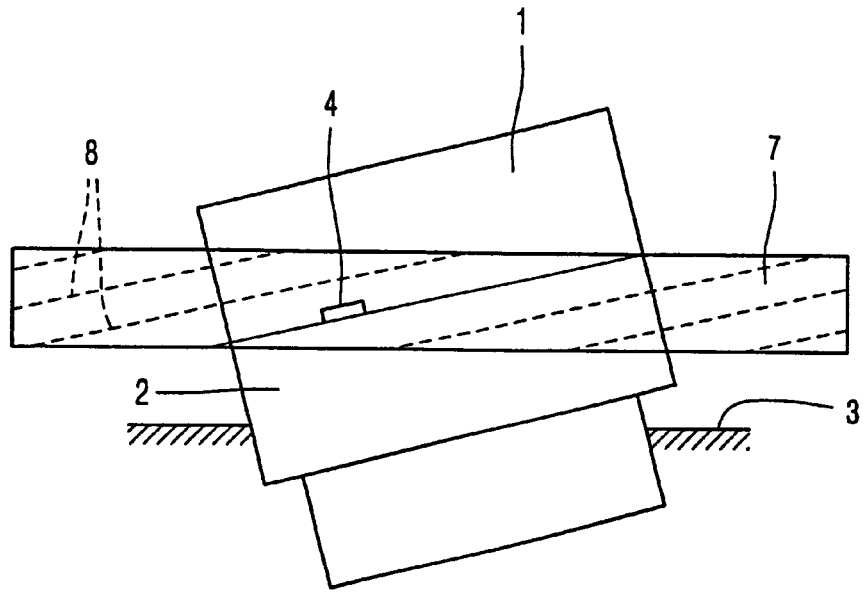
FIG. 1 is a diagrammatic side view of a rotary magnetic head device for a Helical scanning magnetic recording and reproducing apparatus, and FIG. 2 a diagrammatic view of an embodiment of the magnetic head in accordance with the invention.
Figure 2:
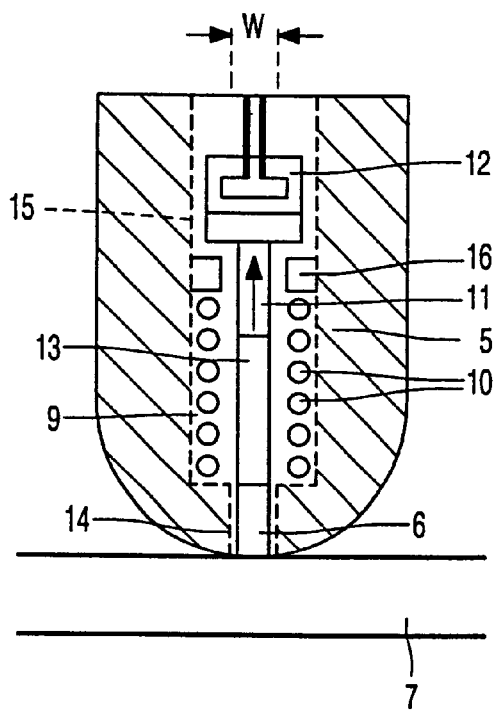

The rotary magnetic head device for a helical scanning magnetic recording and reproducing apparatus as illustrated in FIG. 1 comprises a rotary drum 1 and a fixed drum 2 situated below the rotary drum. The fixed drum 2 is rigidly connected in an oblique position to the house 3 of the helical scanning magnetic recording and reproducing apparatus, and is provided with a motor for driving the rotary drum 1 with respect to the fixed drum 2. The rotary drum 1 is provided with two recesses 4, only one of which being visible in FIG. 1, in each recess having mounted a housing 5 with a magnetic head 6 (FIG. 2). When a magnetic tape 7 is wound around part of the outer peripheral surface of the rotary drum 1 and moved along the magnetic head device, as a consequence of the oblique position thereof with respect to the house 3 and therefore, to the tape 7, information is recorded or reproduced according oblique magnetic tracks 8.

The magnetic head 6 is of the thin-film type and protrudes from the rotary drum 1 in the diametrical direction for coming into contact with the magnetic tape 7. In order to avoid fluctuations in the signal strength and to minimize noise, the rotary magnetic head device is provided with head control means for adjusting the protrusion of the magnetic head 6 and therewith, the normal force exerted by the magnetic head 6 on the tape 7. The head control means comprises a feed-forward control arrangement, in the embodiment shown in FIG. 2 formed by a voice-coil-actuator 9 which is energized with a constant electric current to bring and hold the magnetic head into a protruded position in which it exerts a constant normal force on the tape 7. In the present embodiment, this normal force is about 3–4 mN and can be obtained by voice-coil-actuators which, as required, are small enough, viz. with a cross-section of about 1×1.5 mm². The voice-coil-actuator 9 comprises a voice-coil 10 and a magnetic rod 11 movable therethrough, one end of the magnetic rod 11 being coupled with the magnetic head 6, and the other end being coupled with a damping device 12. Elastomer connections means 13 are provided to couple the magnetic head 6 with the magnetic rod 11.

The housing 5 comprises a first hole 14 to accommodate the magnetic head 6. This first hole 14 opens into a second hole 15, the second hole 15 accommodating the voice-coil-actuator 9. The second hole 15 is in line with and wider than the first hole 14. The first hole 14, having a width W in the direction parallel to the tape tracks 8 in the order of 25 $\mu$m, is matched, in the tape track direction, to the dimensions of the magnetic head 6, viz. in such a way that side motions of the magnetic head 6 in the tape track direction are strongly limited, while the friction between the inner wall of the first hole 14 and the magnetic head 6 is kept small with respect to the normal force exerted by the magnetic head 6 on the tape 7.

Further, in the housing 5, and in the embodiment of FIG. 2 in the second hole 15 thereof, there is provided a stop 16 for arresting the movement of the magnetic head 6 in the diametrical direction out of the housing 5.

It is to be noted that the invention is not limited to the described embodiment and that many modifications thereof are possible. In the rotary magnetic head device, one or more magnetic heads, each in a corresponding housing, can be brought, depending on the rotational speed of the rotary drum and the required tape track distance. Instead of a voice-coil-actuator, other types of feed-forward control arrangements can be applied, such as a mechanical feed-forward control arrangement in the form of controllable spring-like elements. It is noted that the feed-forward control arrangement (servo filter) may also be implemented as the cascade of a synchronous demodulator and a 5th order anolog filter. This measure has a favorable effect on the performance.

What is claimed is:

1. A rotary magnetic head device for a helical scanning magnetic recording and reproducing apparatus, said rotary magnetic head device comprising:

a rotary drum;

a thin-film magnetic head protruding from said rotary drum in a diametrical direction for coming into contact with a magnetic tape, obliquely wound around part of the outer peripheral surface of said rotary drum; and head control means for adjusting the protrusion of the magnetic head in the diametrical direction, wherein the head control means comprises a feed-forward control arrangement for bringing and holding the magnetic head into a protruded position such that said magnetic head exerts a constant normal force on a tape wound around the drum.

2. The rotary magnetic head device as claimed in claim 1, wherein the normal force is approximately 3–4 mN.

3. The rotary magnetic head device as claimed in claim 1 or 2, characterized in that the feed-forward control arrangement comprises a voice-coil-actuator energized with a constant electric current, wherein a strength of the constant electric current determines a magnitude of the normal force.

4. The rotary magnetic head device as claimed in claim 3, characterized in that the voice-coil-actuator comprises a voice-coil and a magnetic rod movable through the voice-coil, the magnetic rod having one end coupled with the magnetic head and and another end coupled with a damping device.

5. The rotary magnetic head device as claimed in claim 4, characterized in that the rotary magnetic head device further comprises elastomer connection means for coupling the magnetic head with the magnetic rod.

6. The rotary magnetic head device as claimed in claim 3, wherein the rotary magnetic head device further comprises a housing for said magnetic head and said voice-coil-actuator.

7. The rotary magnetic head device as claimed in claim 6, characterized in that the housing comprises a first hole for accommodating the magnetic head, a second hole, said first hole opening into said second hole, said second hole accommodating the voice-coil-actuator and being in line with and wider than the first hole.

8. The rotary magnetic head device as claimed in claim 7, characterized in that, at least in a direction of tape tracks formed on the magnetic tape, a width of the first hole is matched to dimensions of the magnetic head such that side motions of the magnetic head in the tape track direction are limited, while friction between an inner wall of the first hole and the magnetic head is kept small with respect to the constant normal force.

9. The rotary magnetic head device as claimed in claim 7, wherein the rotary magnetic head device further comprises a stop for limiting movement of the magnetic head in the diametrical direction out of the housing.

10. A helical scanning magnetic recording and reproducing apparatus comprising a rotary magnetic head device as claimed in claim 1.

* * * * *